(No Model.)
T. D. OAKLEY.
TYPE CASE.
No. 507,718. Patented Oct. 31, 1893.
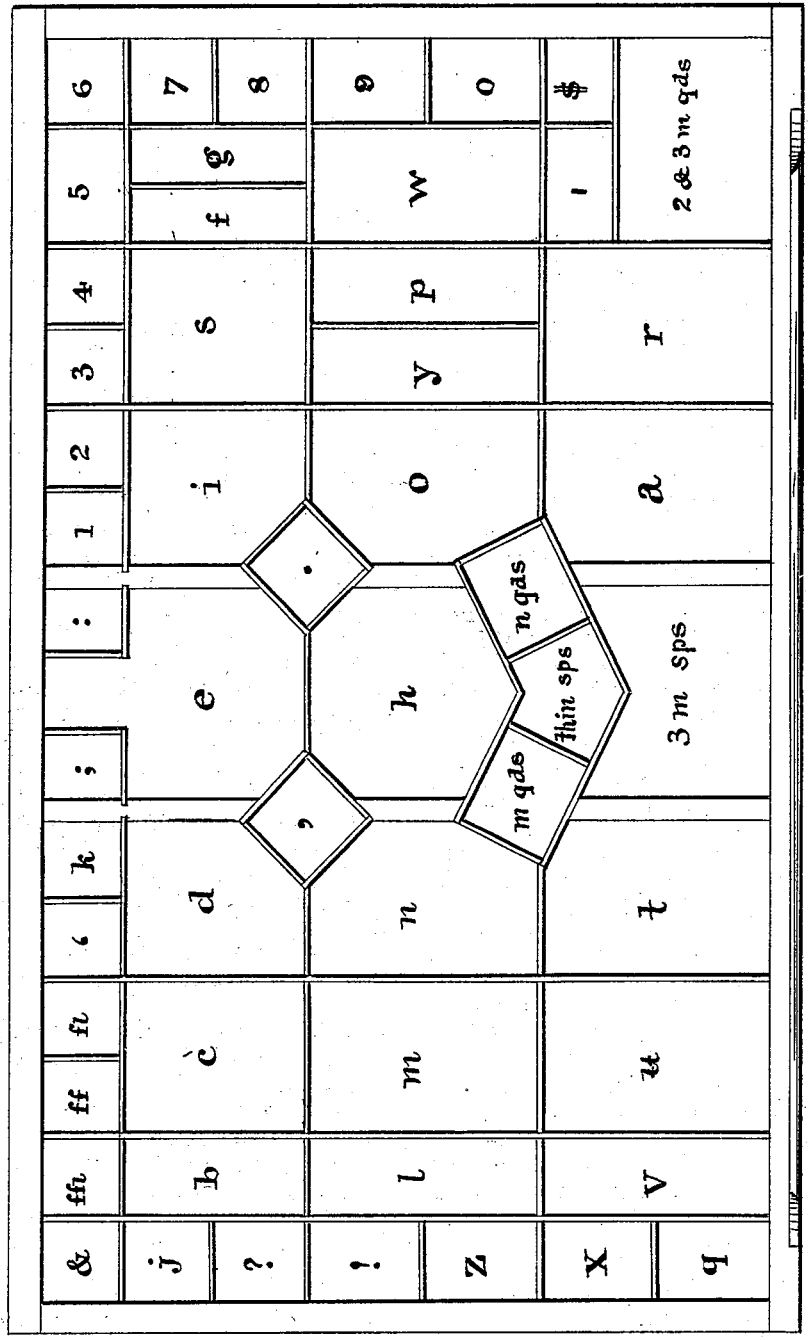
WITNESSES:
Saml R. Furner
Van Buren Hillyard.
INVENTOR
Theophield Danglad Oakley.
BY
R. S. & A. A. Lacey
his ATTORNEYS

UNITED STATES PATENT OFFICE.

THEOPHIELD DANGLAD OAKLEY, OF VEVAY, INDIANA.

TYPE-CASE.

SPECIFICATION forming part of Letters Patent No. 507,718, dated October 31, 1893.

Application filed September 3, 1890. Serial No. 363,813. (No model.)

*To all whom it may concern:*

Be it known that I, THEOPHIELD DANGLAD OAKLEY, a citizen of the United States, residing at Vevay, in the county of Switzerland and State of Indiana, have invented certain new and useful Improvements in Type-Cases; and I do hereby declare the following to be a full, clear, and exact description of the invention, such as will enable others skilled in the art to which it appertains to make and use the same.

This invention relates to printers' type cases; and has for its object to reduce the size of the case without diminishing its storage room as compared with cases of like capacity.

A further object of the invention is to proportion the boxes to the bulk of like type in a font, thereby economizing space, and to locate such type as is used more frequently than others nearer the compositor, thereby lessening the reach and the labor and rendering the work less fatiguing and more rapid.

The improvement consists of the novel features which will be hereinafter more fully described and claimed, and which are shown in the accompanying drawing, which is a top plan view of a type case embodying my invention.

The "h" box is centrally disposed, and the "e" and "three em space" boxes are placed above and below the "h" box, respectively. The period, comma, "em quads" and "en quads" are arranged at the four corners of the "h" box, as shown, and the "thin space" box is between the "em quad" and the "en quad" boxes, as shown. The semi-colon and colon boxes are located in or at top of "e" box, as shown, thereby making ten boxes directly in front of compositor. The "t" and "a" boxes are on each side of the "three em space" box. The "n" and "d" boxes are directly above the "t" box, and the "o" and "i" boxes are above the "a" box. The "u," "m" and "c" boxes are to the left of the "t," "n" and "d" boxes and to their left are the "v," "l," and "b" boxes. The "r" and "s" boxes are to the right of the "a" and "i" boxes. The "y" and "p" boxes are between the "s" and "r" boxes. The "w" box is to the right of the "p" box and above it are the "f" and "g" boxes, while below it is the hyphen box. The "two and three em quad" boxes are in the lower right hand corner. The "h," "e," "three em space," "a," "r," "o," "i," "s," "two and three em quad," "d," "n," "t," "c," "m," and "u" boxes are approximately the same size and capacity. The "f," "g," "y," "p," "b," "l," and "v" boxes are of about the same capacity and one half the size of the "h" and other boxes. Boxes of nearly equal capacity and about one fourth the size of the "h" and "u" boxes and about one half the capacity of the "f" and "v" boxes extend vertically on the two sides and across the top of the case, as shown, and may be designated, respectively, as the "q," "x," "z," "!," "?," "j," "&," "ffi," "ff," "fi," "?," "k," ";," ":," "1," "2," "3," "4," "5," "6," "7," "8," "9," "0" and "$" boxes, respectively.

The numerals extending across the top from 1 to 6 and down on the right-hand side from 6 to 0 has been found to be a very convenient arrangement, and results in economy of construction.

Having thus described my invention, what I claim, and desire to secure by Letters Patent, is—

1. A type case having a diagonally disposed box at the contiguous corners of four boxes, substantially as described.

2. A type case having a diagonally disposed box at each of the four corners of a box, each diagonally disposed box being at the contiguous corners of four boxes, two of the said diagonal boxes having a third box between them, substantially as shown and described.

In testimony whereof I affix my signature in presence of two witnesses.

THEOPHIELD DANGLAD OAKLEY.

Witnesses:
JAMES A. VAN OSDOL,
BRYANT MCMAKIN.